US007583663B1

(12) United States Patent
Gaudet

(10) Patent No.: US 7,583,663 B1
(45) Date of Patent: *Sep. 1, 2009

(54) SYSTEMS AND METHODS FOR CONVERTING A P PACKET/CYCLE DATAPATH TO A Q PACKET/CYCLE DATAPATH

(75) Inventor: Brian Gaudet, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 477 days.

This patent is subject to a terminal disclaimer.

(21) Appl. No.: 11/458,809

(22) Filed: Jul. 20, 2006

Related U.S. Application Data

(63) Continuation of application No. 09/895,218, filed on Jul. 2, 2001, now Pat. No. 7,103,038.

(51) Int. Cl.
*H04L 12/50* (2006.01)
*H04L 12/56* (2006.01)
*H04L 12/54* (2006.01)
*G06F 13/00* (2006.01)
*G06F 7/38* (2006.01)

(52) U.S. Cl. .................. 370/366; 370/412; 370/428; 711/109; 712/225

(58) Field of Classification Search ......... 370/463–467, 370/366, 394, 412–421, 532–545; 711/109, 711/202, 219; 712/225
See application file for complete search history.

(56) References Cited

U.S. PATENT DOCUMENTS

| 4,556,850 | A | 12/1985 | McBrien |
| 4,907,225 | A | 3/1990 | Gulick et al. |
| 5,220,325 | A | 6/1993 | Ackland et al. |
| 5,365,519 | A | 11/1994 | Kozaki et al. |
| 5,381,409 | A | 1/1995 | Folkert de Vries |
| 5,768,630 | A | 6/1998 | Kim |
| 5,790,786 | A | 8/1998 | Wakeman et al. |
| 6,385,671 | B1 | 5/2002 | Hunsaker et al. |
| 6,421,348 | B1 | 7/2002 | Gaudet et al. |
| 6,509,851 | B1 | 1/2003 | Clark et al. |
| 6,650,638 | B1 | 11/2003 | Walker et al. |
| 7,103,038 | B1 * | 9/2006 | Gaudet ................ 370/366 |
| 2001/0012290 | A1 | 8/2001 | Kanazashi |

OTHER PUBLICATIONS

Gaudet, B., co-pending U.S. Appl. No. 09/895,218, filed Jul. 2, 2001, "Systems and Methods for Converting a P Packet/Cycle Datapath to a Q Packet/Cycle Datapath".

* cited by examiner

*Primary Examiner*—Tri H Phan
(74) *Attorney, Agent, or Firm*—Harrity & Harrity, LLP

(57) ABSTRACT

A system includes a queue that stores P data units, each data unit including multiple bytes. The system further includes a control unit that shifts, byte by byte, Q data units from the queue during a first system clock cycle, where Q<P, and sends, during the first system clock cycle, the Q data units to a processing device configured to process a maximum of Q data units per system clock cycle.

29 Claims, 4 Drawing Sheets

SYSTEMS AND METHODS FOR CONVERTING A P PACKET/CYCLE DATAPATH TO A Q PACKET/CYCLE DATAPATH

CROSS REFERENCE TO RELATED APPLICATION

The present application is a continuation of U.S. application Ser. No. 09/895,218, filed Jul. 2, 2001, and issued as U.S. Pat. No. 7,103,038, the disclosure of which is incorporated by reference herein in its entirety.

BACKGROUND OF THE INVENTION

A. Field of the Invention

The present invention relates generally to packet processing and, more particularly, to converting a first data path that carries up to P packets per processing cycle to a second data path that carries Q packets per processing cycle, where Q<P.

B. Description of Related Art

Packet processing systems, including any type of router, server or host that communicates using a packet-switching access mechanism, conventionally receive and process multiple packets in a single system cycle. A packet processing system may include a wide data path for receiving multiple packets in parallel during a single system cycle. Processing the packets at the rate they are received may require multiple instances of processing logic operating in parallel. If the packet processing system receive data path is N bytes wide, and the minimum packet that must be processed is M bytes, then P=N/M instances of the processing logic may be required to process all packets in a given system cycle. For example, conventional Cyclical Redundancy Checking (CRC) may be performed to determine packet data errors.

Multiple instances of processing logic in the packet processing system, however, may have many drawbacks, such as increased power demands and space requirements in the system. In Application Specific Integrated Circuits (ASICs), for example, multiple instances of processing logic utilize valuable area of the ASIC. Multiple elements operating in parallel also increase timing complexity in the system.

To decrease space and power requirements in the packet processing system, it would, thus, be desirable to reduce the instances of the logic required to process multiple packets received during a single system cycle. For example, reduction of the processing logic to, for example, a single instance would significantly reduce space and power requirements. Therefore, to enable the use of a single instance of packet processing logic, there exists a need for systems and methods that can convert a data path carrying P packets per cycle to a data path that carries only Q packets per cycle, such as Q=1 packet per cycle.

SUMMARY OF THE INVENTION

Consistent with the principles of the invention disclosed and claimed herein, these and other needs are addressed by queuing up to P packets per cycle received on a first data path and outputting Q packets per cycle on a second data path, where Q<P. Thus, in one embodiment, the packet processing system may use only a single instance of processing logic, such as, for example, CRC logic to process the P packets.

According to one aspect, a method may include storing P data units, each comprising multiple bytes, in a queue. The method may further include shifting, byte by byte, Q data units from the queue during a first system clock cycle, wherein Q<P and sending, during the first system clock cycle, the Q data units to a processing device configured to process a maximum of Q data units per system clock cycle.

According to another aspect, a system may include a queue that stores P data units, each data unit including multiple bytes. The system may further include a control unit that shifts, byte by byte, Q data units from the queue during a first system clock cycle, wherein Q<P, and sends, during the first system clock cycle, the Q data units to a processing device configured to process a maximum of Q data units per system clock cycle.

According to an additional aspect, a system may include a queue configured to receive and store first P packets during a first system clock cycle and a processing device configured to process a maximum of Q packets per system clock cycle. The system may further include a control unit configured to selectively retrieve first Q packets of the first P packets from the queue during the first system cycle, wherein Q<P, and send the Q packets to the processing device for processing during a single system clock cycle.

According to yet another aspect, a system may include a clock device configured to produce clock signals having a system clock cycle, a data path configured to carry a maximum of P data units per system clock cycle and a data processing device configured to process a maximum of Q data units per system clock cycle. The system may further include one or more devices connected to the data path and the data processing device and configured to receive P data units from the data path during a first system clock cycle, and supply, during the first system clock cycle, first Q data units of the P data units to the data processing device for processing, wherein Q<P.

According to a further aspect, a method may include receiving P data units during a first system clock cycle, where each of the P data units includes multiple bytes, and storing the P data units in a queue. The method may further include selectively retrieving bytes of the P data units from the queue until Q data units have been retrieved, where Q<P, and sending, during the first system clock cycle, the Q data units to a data processing device capable of handling a maximum of Q data units per clock cycle.

According to another aspect, a system may include a queue configured to receive P data units during a first system clock cycle, where each of the P data units includes multiple bytes, and store the P data units. The system may further include a control unit configured to selectively retrieve bytes of the P data units from the queue until Q data units have been retrieved, where Q<P, and send, during the first system clock cycle, the Q data units to a data processing device capable of handling a maximum of Q data units per clock cycle.

BRIEF DESCRIPTION OF THE DRAWINGS

The accompanying drawings, which are incorporated in and constitute apart of this specification, illustrates an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide mechanisms that can queue up to P packets per cycle received on a first data path and output Q packets per cycle on a second data path, wherein Q<P. In one embodiment, Q=1, thus, enabling the use of a single instance of packet processing logic to process the received P packets.

Exemplary Packet Processing System

Figure 1:
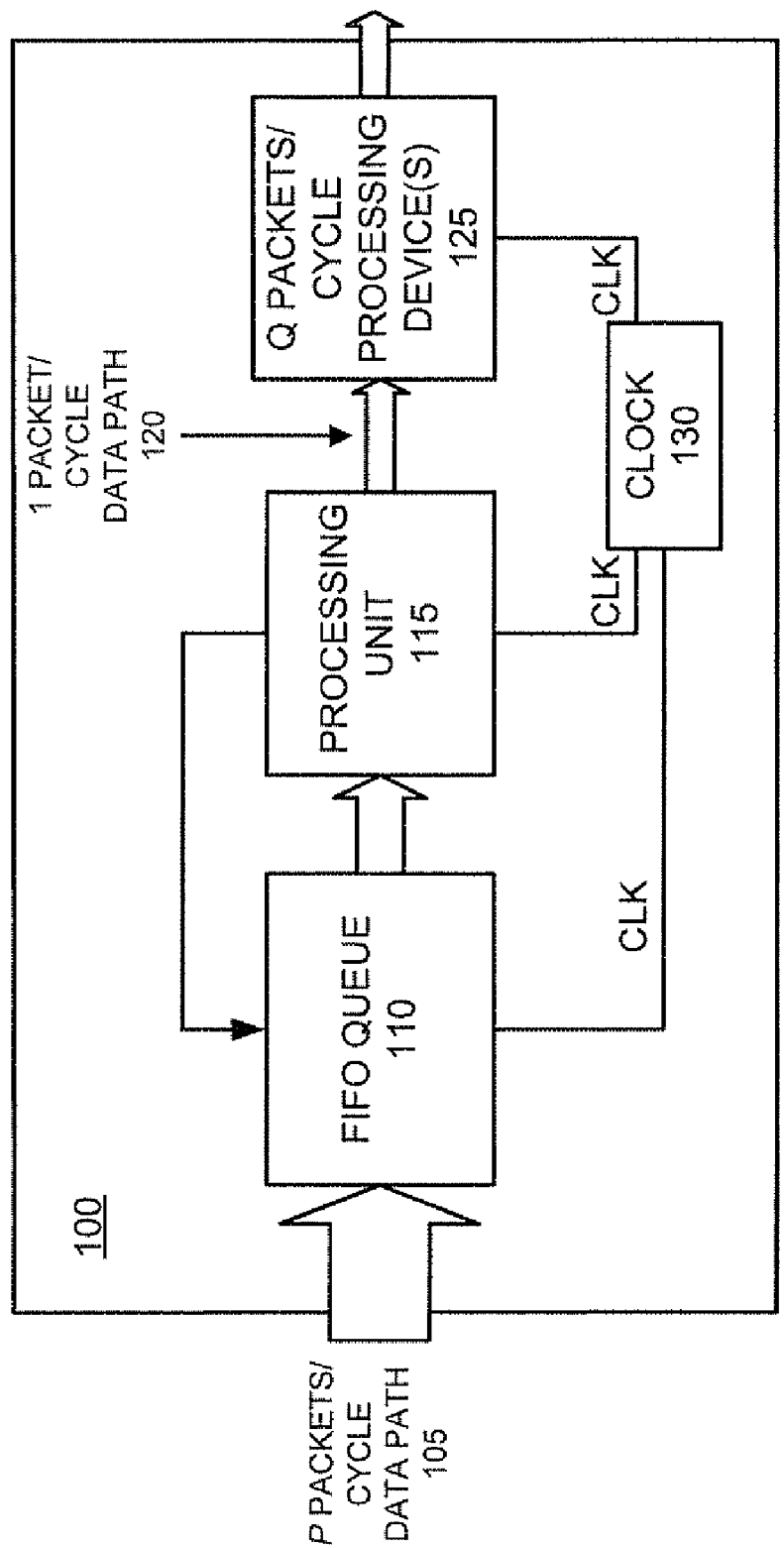
FIG. 1 is an exemplary diagram of a packet processing system consistent with the principles of the invention.

FIG. 1 is a diagram of an exemplary packet processing system 100 that converts a data path that may carry up to P packets per processing cycle to a data path that carries Q packets, such as a single packet, per processing cycle. Packet processing system 100 may reside in, or be connected to, any device that receives or transmits packet data, such as a packet router, a bridge, a switch fabric, or any server or host that handles packets.

Packet processing system 100 may include a data path 105, a FIFO queue 110, a processing unit 115, a data path 120, a processing device(s) 125, and a clock 130. Data path 105 may be N data units, such as N bytes, in width and may include conventional mechanisms for receiving up to P packets per processing cycle and for transmitting the received packets to FIFO queue 110. FIFO queue 110 can receive and store packets received from data path 105 and may include one or more memory devices (not shown).

Processing unit 115 may include a processor that contains instructions for processing data received from FIFO queue 110. Processing unit 115 may alternatively include logic circuitry that performs the equivalent functions of a processor. Processing unit 115 also may include flow control feedback to FIFE queue 110.

Processing device(s) 125 may include a device that processes up to Q incoming packets per processing cycle. For example, processing device(s) 125 may include a Cyclical Redundancy Check (CRC) unit that performs conventional CRC data error checks upon packets received via data path 105. Processing device(s) 125 may also include multiple devices that can each process a maximum of Q packets per cycle, where each of the multiple devices may perform different functions. For example, processing device(s) 125 may include a checksum unit, a CRC unit and a FIFE unit, with each unit processing a maximum of Q packets/cycle, such as 1 packet/cycle.

Clock 130 includes conventional circuitry for supplying clock signals to the components of packet processing system 100. Clock 130 may, for example, supply a clock signal to FIFO queue 110, processing unit 115, and processing device(s) 125.

Exemplary FIFO Queue and Processing Unit

Figure 2:
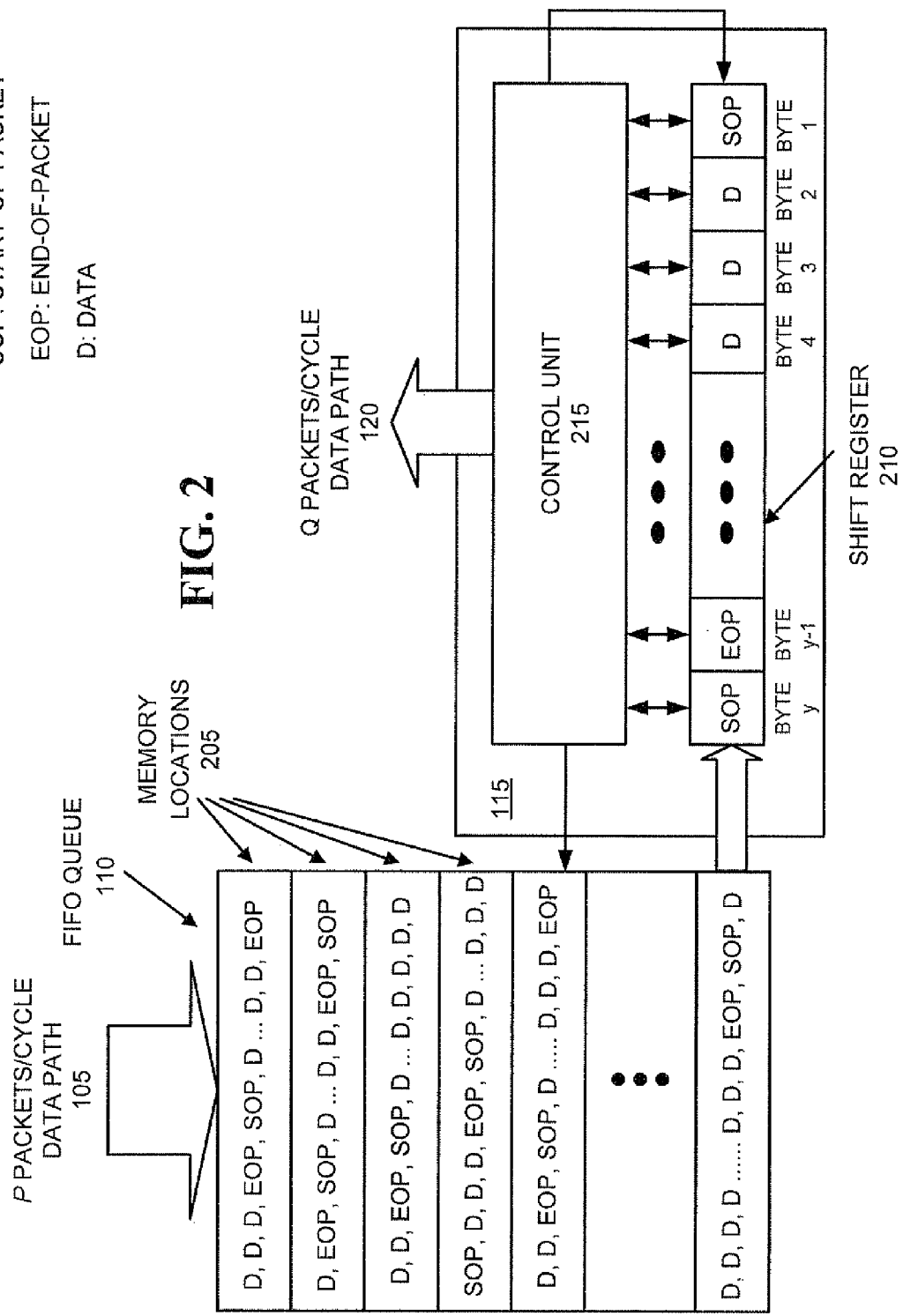
FIG. 2 is an exemplary diagram of the First-in-First-Out (FIFO) queue and processing unit of FIG. 1 according to an implementation consistent with the principles of the invention.

FIG. 2 illustrates exemplary components of FIFO queue 110 and processing unit 115 according to an implementation consistent with the principles of the present invention. FIFO queue 110 may include memory locations 205 for storing bytes of packets received via data path 105. Processing unit 115 may include a shift register 210 and a control unit 215. Shift register 210 may include memory storage units that can right shift individual data units from FIFO queue 110 into shift register 210. Shift register 210 may include memory storage units for storing y data units. Control unit 215 may include a processing device that can retrieve data units from shift register 210 and pass individual packets, composed of the retrieved data units, on data path 120. Control unit 215 may alternatively include logic circuitry that performs the equivalent functions of a processing device.

Exemplary Packet Processing

Figure 3:
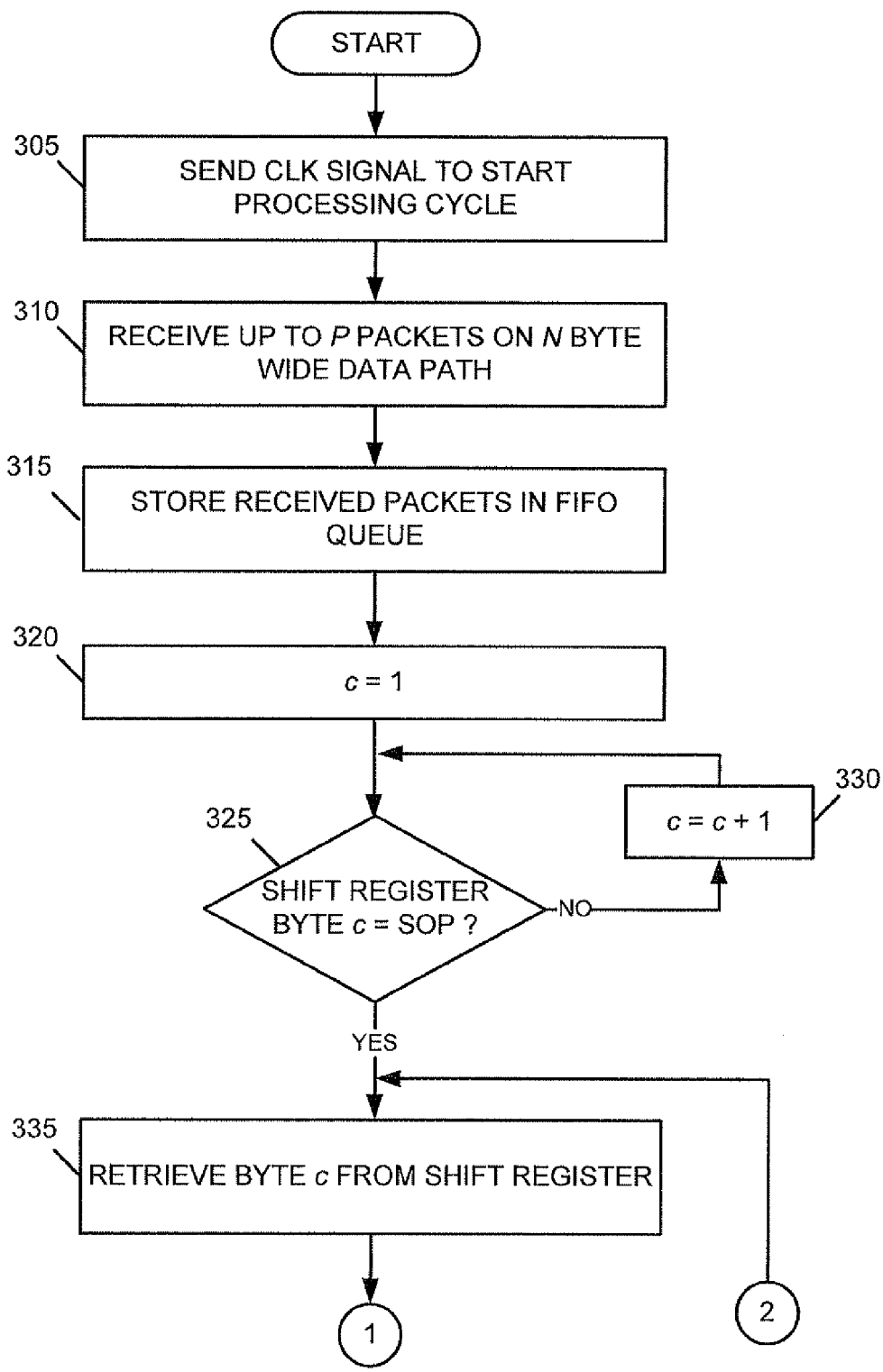
FIGS. 3-4 are exemplary flowcharts of processing by the packet processing system of FIG. 1 according to an implementation consistent with the principles of the invention.
Figure 4:
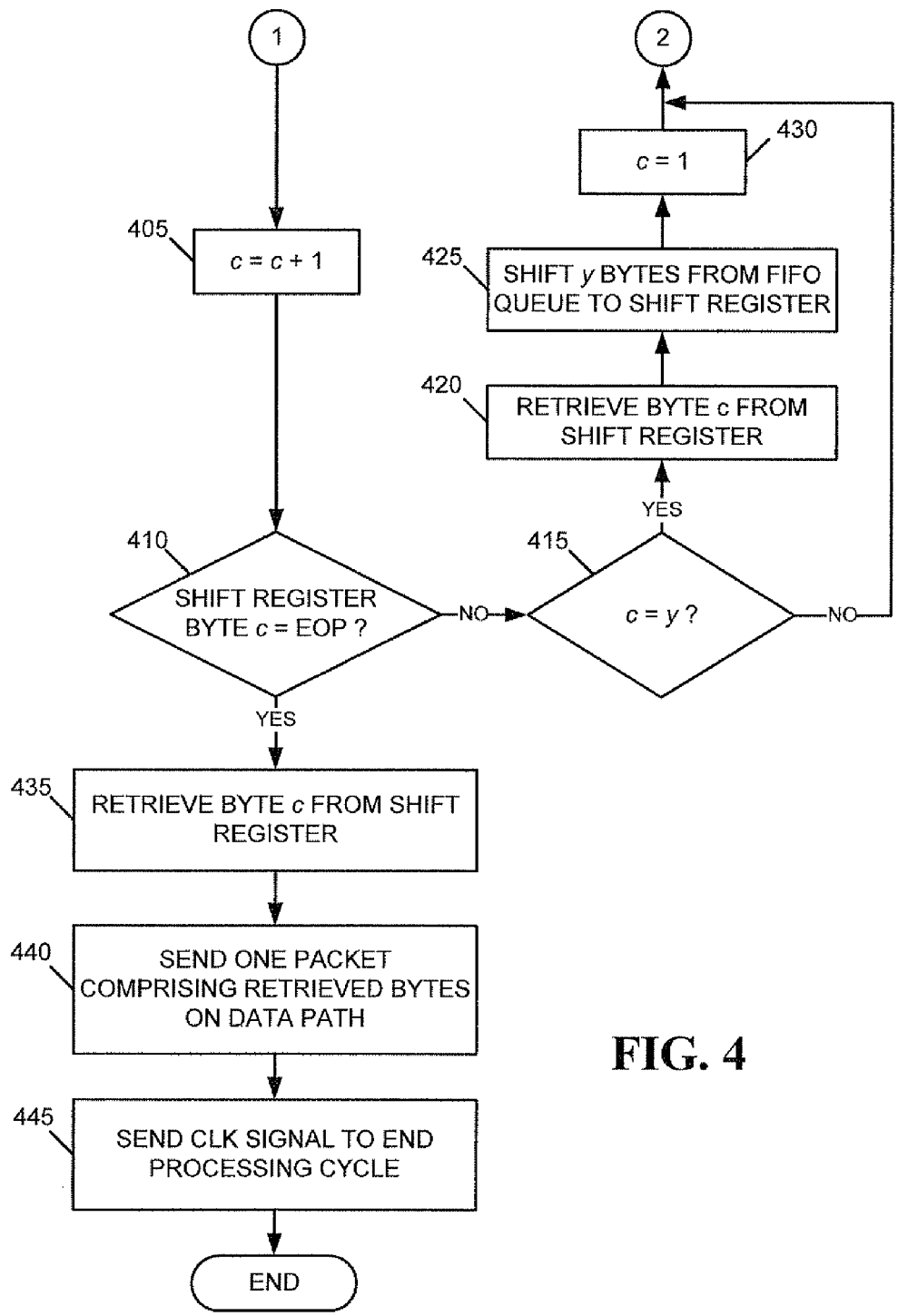

FIGS. 3-4 are exemplary flowcharts of processing by a system, such as packet processing system 100, according to an implementation consistent with the principles of the invention. Processing may begin by sending a clock (CLK) signal to start a processing cycle (step 305). Up to P packets may be received on a N byte data path during the processing cycle defined by the clock signal (step 310). The received packets may be stored in a FIFO queue (step 315). Byte counter c may be set to one (step 320) and it may be determined if byte c of the shift register indicates that it is a first byte of a packet (step 325). For example, byte c may include a start-of-packet (SOP) indicator. If byte c does not include an SOP indicator, the byte counter c may be incremented (step 330), and the process may return to step 325. If the byte c does include an SOP indicator, then byte c may be retrieved from the shift register (step 335).

Turning to FIG. 4, byte counter c may be incremented (c=c+1) (step 405) and it may be determined if byte c in the shift register indicates that it is a last byte of a packet (step 410). For example, the byte may include an end-of-packet (EOP) indicator. If not, then it may be determined whether byte counter c is equal to the byte capacity y of the shift register (step 415). If byte counter c is equal to the maximum byte capacity (y) of the shift register, then byte c may be retrieved from the shift register (step 420) and y bytes may be right shifted from the FIFO queue into the shift register (step 425). Byte counter c may then be reset to one (step 430) and processing may return to step 335. If byte counter c is not equal to the byte storage capacity y of the shift register, then processing may return to step 335.

If byte c of the shift register indicates that it is the last byte of a packet, byte C may be retrieved from the shift register (step 435). A packet may then be sent including the retrieved bytes on a 1 packet/cycle data path (step 440) at, or before, completion of the current processing cycle defined by the clock signal (step 445).

CONCLUSION

Consistent with the principles of the present invention, a data path carrying more than one packet per system cycle may be converted to a data path that carries only Q packets per system cycle, such as 1 packet/cycle. Thus, packet processing may be performed using only a single instance of processing logic, such as CRC logic, to process multiple packets received during a single system cycle.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 3-4, the order of the steps may differ or be performed in parallel in other implementations consistent with the present invention. Use of the "step" in the disclosure is not used in any functional sense, but rather refers to specific acts. Although apparatus, methods and other embodiments consistent with the principles of the invention may process incoming packets and bytes, other units of data may be processed without departing from the spirit and scope of the invention. For example, data entities other then packets can be processed and data units other than bytes can be used to transfer the data entities through the system.

The scope of the invention is defined by the claims and their equivalents.

What is claimed is:

1. A method, comprising:
   storing P data units, each comprising multiple bytes, in a queue;
   shifting, byte by byte, Q data units from the queue during a first system clock cycle, wherein Q<P; and
   sending, during the first system clock cycle, the Q data units to a processing device configured to process a maximum of Q data units per system clock cycle.

2. The method of claim 1, wherein shifting Q data units from the queue byte by byte comprises:
   shifting the Q data units from the queue byte by byte into a shift register.

3. The method of claim 2, further comprising:
   selectively retrieving bytes from the shift register and shifting bytes into the shift register to re-fill the shift register, until a byte that indicates that it is the last byte of the Q data units is shifted into the shift register.

4. The method of claim 3, wherein sending, during the first system clock cycle, the Q data units comprises:
   sending the Q data units to the processing device when the last byte of the Q data units is retrieved from the shift register.

5. The method of claim 1, wherein the Q data units equals 1 data unit.

6. The method of claim 1, wherein the Q data units comprise packets.

7. The method of claim 1, wherein the processing device comprises a cyclical redundancy checker (CRC).

8. A system, comprising:
   a queue that stores P data units, each data unit comprising multiple bytes;
   a control unit that shifts, byte by byte, Q data units from the queue during a first system clock cycle, wherein Q<P, and sends, during the first system clock cycle, the Q data units to a processing device configured to process a maximum of Q data units per system clock cycle.

9. The system of claim 8, further comprising:
   a shift register,
   wherein the control unit shifts the Q data units from the queue byte by byte into the shift register.

10. The system of claim 9, wherein the control unit selectively retrieves bytes from the shift register and shifts bytes into the shift register to re-fill the shift register, until a byte that indicates that it is the last byte of the Q data units is shifted into the shift register.

11. The system of claim 10, wherein the control unit sends the Q data units to the processing device when the last byte of the Q data units is retrieved from the shift register.

12. The system of claim 9, wherein the Q data units equals 1 data unit.

13. The system of claim 9, wherein the Q data units comprise packets.

14. The system of claim 9, wherein the processing device comprises a cyclical redundancy checker (CRC).

15. A system, comprising:
   a queue configured to receive and store first P packets during a first system clock cycle;
   a processing device configured to process a maximum of Q packets per system clock cycle;
   a control unit configured to:
      selectively retrieve first Q packets of the first P packets from the queue during the first system cycle, wherein Q<P, and
      send the Q packets to the processing device for processing during a single system clock cycle.

16. The system of claim 15, wherein the control unit is further configured to:
   retrieve second Q packets of the first P packets from the queue during a second system cycle, wherein Q<P, and
   send the second Q packets to the processing device for processing during a single system clock cycle.

17. The system of claim 15, wherein the queue is configured to receive and store second P packets during a second system clock cycle, and wherein the control unit is further configured to:
   selectively retrieve second Q packets of the second P packets from the queue during the second system cycle, wherein Q<P, and
   send the second Q packets to the processing device for processing during a single system clock cycle.

18. The system of claim 15, wherein the Q data units equals 1 data unit.

19. The system of claim 15, wherein the Q data units comprise packets.

20. The system of claim 15, wherein the processing device comprises a cyclical redundancy checker (CRC).

21. A system, comprising:
   a clock device configured to produce clock signals having a system clock cycle;
   a data path configured to carry a maximum of P data units per system clock cycle;
   a data processing device configured to process a maximum of Q data units per system clock cycle;
   one or more devices connected to the data path and the data processing device and configured to:
      receive P data units from the data path during a first system clock cycle, and
      supply, during the first system clock cycle, first Q data units of the P data units to the data processing device for processing, wherein Q<P.

22. The system of claim 21, wherein the one or more devices are further configured to:
   supply, during a second system clock cycle, second Q data units of the P data units to the data processing device for processing.

23. A method, comprising:
   receiving P data units during a first system clock cycle, wherein each of the P data units comprises a plurality of bytes;
   storing the P data units in a queue;
   selectively retrieving bytes of the P data units from the queue until Q data units have been retrieved, where Q<P; and
   sending, during the first system clock cycle, the Q data units to a data processing device capable of handling a maximum of Q data units per clock cycle.

24. The method of claim 23, wherein selectively retrieving bytes of the P data units from the queue comprises:
   shifting bytes from the queue into a shift register; and
   retrieving bytes from the shift register until the Q data units have been retrieved.

25. The method of claim 23, further comprising:

processing, via the data processing device, the Q data units during the first system clock cycle.

26. The method of claim 23, wherein Q data units equals one data unit.

27. The method of claim 23, wherein the Q data units comprise packets.

28. The method of claim 23, further comprising:

receiving P data units during a second system clock cycle, wherein each of the P data units comprises a plurality of bytes;

storing the P data units in the queue;

selectively retrieving bytes of the P data units from the queue until Q data units have been retrieved, where $Q<P$; and sending, during the second system clock cycle, the Q data units to a data processing device capable of handling a maximum of Q data units per clock cycle.

29. A system, comprising:

a queue configured to:

receive P data units during a first system clock cycle, wherein each of the P data units comprises a plurality of bytes, and store the P data units;

a control unit configured to:

selectively retrieve bytes of the P data units from the queue until Q data units have been retrieved, where $Q<P$, and send, during the first system clock cycle, the Q data units to a data processing device capable of handling a maximum of Q data units per clock cycle.

* * * * *